May 24, 1938.  O. H. SCHADE  2,118,111
GRID DETECTOR CIRCUIT
Filed Jan. 3, 1935   2 Sheets—Sheet 1
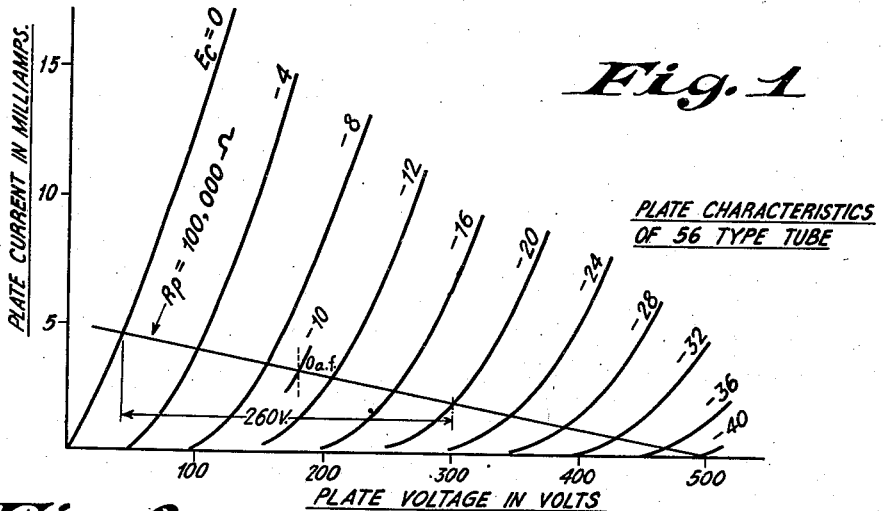
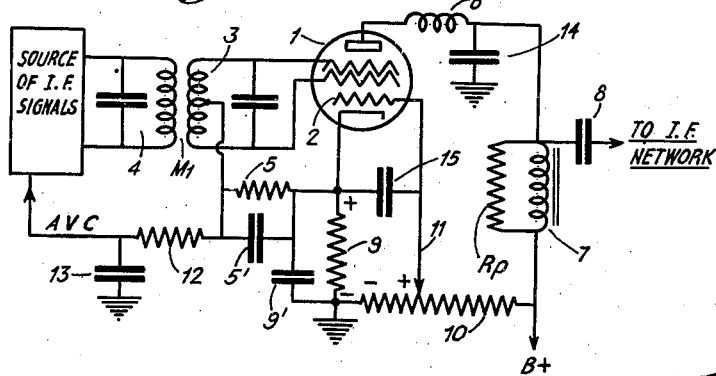
INVENTOR
OTTO H. SCHADE
BY
ATTORNEY May 24, 1938.  O. H. SCHADE  2,118,111
GRID DETECTOR CIRCUIT
Filed Jan. 3, 1935  2 Sheets-Sheet 2
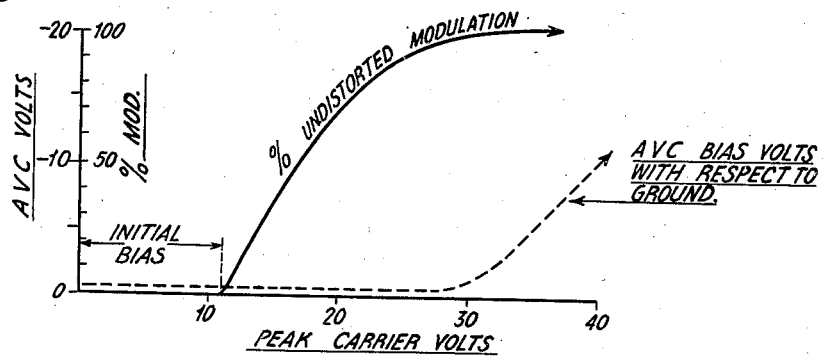
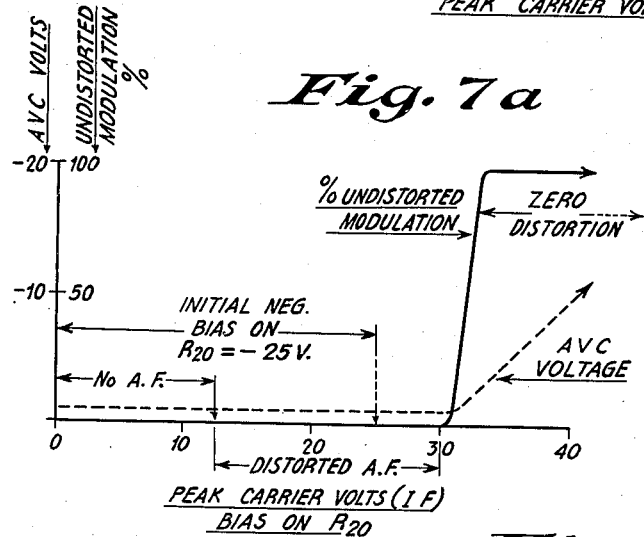
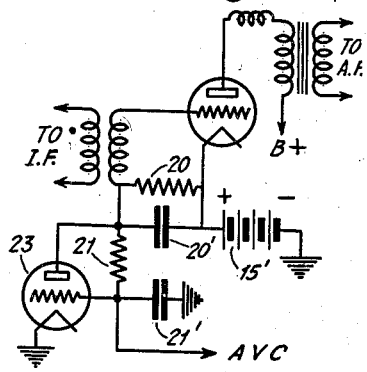
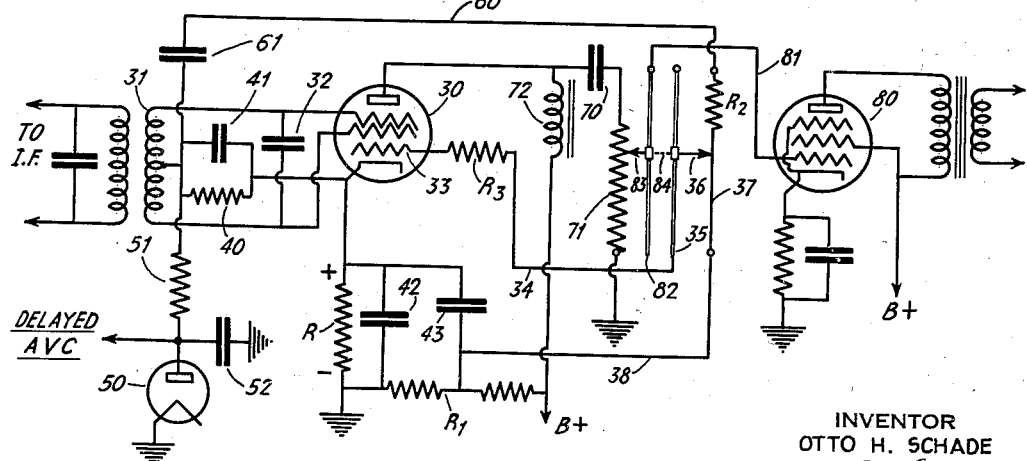
INVENTOR
OTTO H. SCHADE
BY
ATTORNEY Patented May 24, 1938

2,118,111

UNITED STATES PATENT OFFICE 2,118,111

GRID DETECTOR CIRCUIT

Otto H. Schade, West Caldwell, N. J., assignor to Radio Corporation of America, a corporation of Delaware Application January 3, 1935, Serial No. 221

9 Claims. (Cl. 250—27)

My present invention relates to signal transmission circuits, and more particularly to a novel method of, and means for, preventing excessive anode current flow in a receiver tube whose control electrode assumes zero bias in the absence of received signals.

One of the important objects of the invention is to provide a signal reception network which includes a tube having a special gain regulation electrode disposed in its electron path, the regulation electrode being connected to a direct current voltage point in the external space current path of the tube in such a manner as to automatically counteract large changes of the space currents which are caused by variations in the effective direct current potentials of the electrodes of the reception tube.

Another important object of the invention is to provide a device in a co-planar grid detector tube circuit for preventing the flow of excessive anode currents through the tube in the absence of signals, the device comprising a control electrode disposed in the electron path of the tube and connected to an impedance in the external anode circuit of the tube in such a manner that the excessive flow is substantially prevented when signals decrease below a predetermined amplitude.

Another object of the invention is to provide a diode delay bias network for a grid detector circuit, the delay network functioning to bias the control electrode of the detector in the absence of received signals, and being independent of modulation percentage when the carrier voltage has increased beyond a predetermined fixed delay voltage.

Still another object of the invention is to provide a co-planar grid detector tube circuit with a gain regulation electrode which is connected to prevent excessive plate current flow in the absence of received signals, and to have impressed thereon, in addition, the audio component of detected signals; the circuit being further provided with a diode delay bias network for automatic volume control of preceding signal transmission tubes from the detector input circuit.

Still other objects of the invention are to improve generally the efficiency of grid detector circuits, and more especially to provide grid detector networks, using co-planar grid tubes, which are not only reliable and durable in operation, but economically assembled in a radio receiver.

The novel features which I believe to be characteristic of my invention are set forth in particularity in the appended claims, the invention itself, however, as to both its organization and method of operation will best be understood by reference to the following description taken in connection with the drawings in which I have indicated diagrammatically several circuit organizations whereby my invention may be carried into effect.

In the drawings:—

Fig. 1 shows graphically the problem solved by the invention,

Fig. 2 is a circuit diagram of an embodiment of the invention,

Fig. 3 graphically shows the functioning of the circuit in Fig. 2,

Fig. 4 is a diagram of a modification of the invention,

Fig. 5 graphically illustrates a characteristic of the circuit in Fig. 4,

Fig. 6 illustrates further characteristics of a circuit of the type shown in Fig. 4, Fig. 7 is a circuit diagram of another modification of the invention, Fig. 7a shows characteristics of the circuit in Fig. 7, Fig. 8 is a circuit diagram of a further modified embodiment of the invention.

In detectors of the grid leak type the negative voltage developed on the grid leak represents the control grid bias, and the fluctuation of this negative voltage above and below the average value, the latter being fixed by the applied carrier voltage, represents the audio frequency grid signal. With changing magnitude of carrier voltage the negative bias value on the control grid of the tube, functioning as an audio amplifier, varies. With small carrier voltages the low bias on the tube shifts the audio operating point to high plate current values; high carrier voltages cause a high negative bias voltage shift of the audio operating point to near the cut-off region of the plate characteristic with subsequent plate rectification and high distortion. In other words a grid leak detector, when viewed as operating as a signal rectifier and an audio amplifier of the audio component of rectified signal energy, gives rise to current overload of the detector tube at zero bias; that is to say, when the carrier voltage is substantially zero.

These characteristics of a grid leak detector have been well known, and various devices have been proposed to minimize the overloading of the plate circuit of the detector tube. To illustrate more fully the nature of the problem sought to be solved by the present invention, there are shown in Fig. 1 the plate voltage-plate current characteristics of a 56 type tube.

This tube is a triode, and the various characteristics show how the plate current through a plate load $R_p$ decreases as the negative voltage $E_c$ developed on the detector grid increases. Assuming that the 56 type tube, whose characteristics are depicted in Fig. 1, is employed as a second detector of the grid leak type in a superheterodyne receiver, it will be seen that the tube allows a peak to peak I. F. grid swing of 40 volts, without excessive plate rectification if the I. F. plate load is 100,000 ohms as shown in Fig. 1.

As grid rectification occurs only on the positive half waves, the d. c. grid voltage for this swing is —20 volts, assuming 100% rectification efficiency. This voltage is the highest obtainable negative grid bias voltage within the operating range. The audio peak to peak grid swing with 100% modulated signal may thus vary from zero to —20 volts. This gives a peak to peak audio plate swing on $R_p$ of approximately 260 volts. This latter voltage corresponds to approximately 130 peak audio volts output and the audio operating point $O_{af}$ (Fig. 1). With 20% modulation and the same carrier voltage the audio peak output therefore would be roughly 26 volts.

By utilizing a co-planar grid in a tube with similar characteristics as the 56 type tube, used as a grid leak detector, the I. F. plate swing is eliminated, thus permitting a maximum negative audio grid voltage of —40 volts on the co-planar grids without causing cut-off. The audio output voltage is, therefore, approximately doubled; so that roughly a maximum of 52 volts is obtainable with 20% modulation for no cut-off at 100% modulation. A grid leak detector utilizing a co-planar grid construction is well known, and has been disclosed, and claimed, by Klaas Posthumus in U. S. P. 1,986,851 of January 8, 1935 application Serial No. 458,328, filed May 31, 1930.

To obtain this output with a tube characteristic as Fig. 1 requires a B-supply voltage of 500 volts, and also a value of grid leak resistance on the following tube which is high compared to the plate load $R_p$. The control grid mu may be made low enough to provide sufficient d—c voltage for automatic volume control purposes. In the latter case the gain decreases, but the maximum audio output is unaffected. The B-supply voltage needed reduces to approximately half the value for a choke or transformer feed of the plate voltage. It is obvious from Fig. 1 that with a 56 type tube, or similar co-planar tube, used as a grid leak detector a transformer could not be used normally except for plate voltages less than 80 volts as the input grid bias without high frequency grid signal is zero, and would cause destructive plate currents to be drawn by the tube at higher plate voltages. (At $E_b=200v$ and $E_c=0$, the plate current is approximately 38 ma.) This plate current overload condition is true for all triodes and pentodes allowing high output voltages or power to be developed with small distortion on sufficiently low plate loads to make possible economic transformer designs.

This limitation is eliminated according to my invention by inserting a separate control grid into the electronic path between the cathode and the co-planar grids, as shown in Fig. 2. In this figure, there is schematically illustrated the circuit details of the second detector network of a superheterodyne receiver. The reference numeral 1 designates an electron discharge tube which includes a cathode, an anode, a pair of coplanarly arranged signal grids, and a regulating grid 2. The co-planar grids are connected to opposite sides of the resonant input circuit 3, and the latter is coupled, as at $M_1$, to the resonant output circuit 4 of the intermediate frequency amplifier network. The circuits 3 and 4 are tuned to the operating intermediate frequency.

The cathode of tube 1 is connected to the midpoint of the secondary of coupling $M_1$ through a grid leak resistor 5 which has a magnitude of substantially 100,000 ohms. The resistor 5 is shunted by a condenser 5' which has a magnitude of 0.0001 mfd. The plate of tube 1 is connected to the positive terminal of the B-supply voltage source through a path which includes an I. F. choke 6 and a high inductance choke 7. The plate side of the choke 7 is connected to an audio frequency coupling condenser 8, and it will be understood that this condenser is connected to any desired audio frequency amplifier network which may include one or more stages of audio amplification, and the amplifier may terminate in a reproducer. The resistor $R_p$ conforms with the plate load line in Fig. 1; the value of $R_p$ may differ depending on the tube characteristics. In Fig. 2, $R_p$ represents the parallel value of a physical resistor and the equivalent core-loss shunt resistance value of the choke 7. It is the equivalent core-loss resistance in the case of an interstage audio transformer working into a stage without grid current.

The cathode of tube 1 is grounded through a resistor 9, and a resistor 10 is connected between the ground side of resistor 9 and the +B side of choke 7. The regulating grid 2 is connected by tap 11 to a desired point on resistor 10. The grid side of resistor 5 is connected to the gain control electrodes of the preceding amplifier networks. This connection has been designated as the "A. V. C." connection, and includes the high resistance 12 having a magnitude of substantially 1,500,000 ohms, the A. V. C. lead being connected to ground through condenser 13 having a magnitude of 0.02 mfd. The resistor 12 and condenser 13 comprise the usual audio filter used in the A. V. C. connection to suppress the audio component of the rectified signal voltage.

The networks preceding the detector tube may be of the usual type, and are believed to be too well known to those skilled in the art to require detailed explanation. These networks usually comprise a radio frequency amplifier preceding the first detector network, and one or more stages of I. F. amplification. These preceding networks have all been conventionally represented, and designated as "Source of I. F. Signals". The resistor 9 is shunted by condenser 9' which has a magnitude of 1 mfd.; and a radio frequency by-pass condenser 14, having a magnitude of 0.001 mfd., is connected between one side of the choke 6 and ground. A suitable radio frequency by-pass condenser 15 is also connected between the cathode of tube 1 and the regulating grid 2.

The plate current flow of tube 1 is controlled by three grids, and if the applied grid voltages on all three grids is zero a certain plate current is obtained. The co-planar grids are in parallel for audio and d. c. voltages; their combined control action on the plate current is shown in the illustrative dynamic characteristic in Fig. 3, the regulating grid being held at zero voltage. The regulating grid also controls the plate current in the same manner, the other grids being kept at zero voltage, but has a different amplification factor.

In Fig. 3 it will be observed that the co-planar grids at −45 volts reduce the plate current to the same value as the regulating grid at −3 volts. If, therefore, the co-planar grids have a bias increasing from zero to −45 volts as caused by an increase in carrier voltage, and, if at the same time the bias of the regulating grid is decreased from −3 volts to zero, the plate current will have a constant value in the center of the dynamic characteristic. A variation of the I. F. amplitude on the co-planar grids, due to modulation, will, therefore, cause plate current swings having a fixed center on a selected dynamic characteristic regardless of the carrier intensity, if the readjustment of the dynamic center by the regulating grid is made automatic.

This is accomplished by using a self-bias on the regulating grid in the circuit shown in Fig. 2. The readjustment of plate current may be made as close as desired by choosing a high value for the self-bias resistor 9, and the bucking voltage on the bleeder resistor 10 to which the regulating grid is returned. For example, assuming a tube with a characteristic as in Fig. 3, the resistor 9 may have a value such that the cathode side of resistor 9 is at +30 volts with normal plate current. The tap 11 is then adjusted to a point on bleeder resistor 10 such that the regulating grid is at a voltage of −3 volts with respect to the cathode (see Fig. 3).

This corresponds to zero I. F. signal, and consequently zero bias on the co-planar grids. If an I. F. signal is now applied, the grid bias on the co-planar grids increases to a value of −30 volts. Without self-bias on the regulating grid 2, the plate current would decrease from point 0, in Fig. 3 to point B. A decrease in current, however, will produce less voltage drop on resistor 9. Thus, the voltage on grid 2 will become less negative with respect to the cathode of tube 1, and shift point B in Fig. 3 back towards point 0. That is to say, an automatic compensation takes place which is the more perfect the higher the d. c. amplification in the tube due to resistor 9 and regulating grid 2.

Due to this arrangement a transformer, or choke, feed, of the plate voltage is made possible at high plate voltage values, as the plate current is limited closely to a desired value, and loads may be used as with a normal class A audio frequency amplifier.

Due to the transformer, or choke, feed, the B voltage required is approximately half of that required for resistance coupling so that, in the case of the example discussed above, an audio output of 52 volts maximum with 20% modulation, and no overload at 100% modulation, would be possible with a transformer and 250 volt B-supply, if the co-planar triode contained a regulating grid and had similar characteristics as shown in Fig. 1. The transformer could feed a push-pull stage which is otherwise difficult to accomplish.

From a transformer cost standpoint it is desirable to operate a transformer from a tube of low plate resistance (10,000 ohms or lower) and, as a high cut-off bias is desirable from the automatic volume control requirements, a grid detector with regulating grid and transformer output load should be of the co-planar triode type. It can be used to drive a class B stage with grid current if its power output for 20% modulation signals is high enough. With resistance coupling a tube having a regulating grid as shown in Fig. 2 permits the use of lower load resistance values without the danger of exceeding the safe emission current, or plate dissipation, value with zero signal input. In tetrode and pentode type tubes such a tube is of considerable advantage as the distortion of small signals due to crowding of the characteristics with higher loads at the knee near zero bias can be avoided, as the dynamic center of the audio swing will move away from the knee due to the action of the regulating grid, which has a similar effect as lowering the screen grid voltage at small signals and raising it at large signals. A pentode type resistance coupled grid detector having a high control grid (co-planar) cut-off bias value, and permitting high plate loads, is very desirable as an audio source working into certain types of tone-compensated volume control networks due to its high internal resistance.

A different method of protecting grid detectors against excessive plate current at zero signal input, and which does not require a regulating grid, will be seen to result from the delayed bias circuit shown in Fig. 4. The cathode of coplanar grid detector tube 1 is made positive with respect to ground by a battery 15 having a voltage $E_d$. This voltage causes a shunt diode 16 to draw current over the resistors 17 and 18. Due to the relatively high values of these resistors the plate of diode 16 is substantially at ground potential. If the I. F. signal on the grid detector becomes large enough to develop by grid rectification a negative voltage on resistor 17 equal to, or higher than, the delay voltage $E_d$, the plate of the diode 16 becomes negative with respect to its cathode and its d. c. shunt effect is removed. This permits the automatic volume control voltage to increase at the same rate as the negative voltage on resistor 17. As the diode 16 operates only with d. c. voltages on account of the I. F. and A. F. filter section, which section includes resistor 18 and condenser 18', the delayed automatic volume control voltage is independent of the modulation percentage. The grid leak resistor 17 is connected between the cathode of tube 1' and the coil in input circuit 3, and condenser 17' is connected in shunt with resistor 17.

The delay voltage $E_d$ may be taken from a bleeder circuit and adjusted to a desired value. Depending on the relative values of resistors 18 and 17, there will be a certain initial negative bias on resistor 17 with zero signal, as the plate of diode 16 is substantially at ground potential. By way of example, for the values of resistors 17=0.1 megohm; resistor 18=1.5 megohms and $E_d$=30 volts, the initial negative voltage on resistor 17 is substantially 1.875 volts, and is derived from the following expression:—

$$E_{R17} = \frac{R17}{R17 + R18} E_d$$

This voltage $E_{R17}$ is a delay voltage on the signal grids. It decreases with increasing I. F. signal, and becomes zero when the voltage due to grid rectification on resistor 17 becomes equal to, or greater than, $E_d$. The signal delay bias causes audio distortion for I. F. voltages below the automatic volume control delay bias voltage $E_d$. Fig. 5 shows a calculated curve giving the values of maximum undistorted percentage of modulation possible versus peak volts of I. F. carrier input for the values of resistors 17 and 18 and $E_d$ as given above. The distortion is not considered serious as it occurs only at the weakest signal voltages not controlling the amplifier tubes.

This initial negative bias on the grid detector (voltage on resistor 17) due to the delay bias voltage $E_d$ may be used to prevent excessive plate current at zero I. F. signal in grid detectors having a high plate voltage. Fig. 6 shows graphically the results of such conditions using a 56 type tube in place of the diode 16 in Fig. 4. For values in Fig. 4 of resistor 17=0.55 megohm, resistor 18=0.91 megohm and $E_d$=30 volts, the obtained automatic volume control bias curve, and possible undistorted modulation percentage versus signal, are plotted in Fig. 6, which shows an initial bias of approximately −11.25 volts on the grid detector.

A modification of the circuit of Fig. 4 is shown in Fig. 7, and the corresponding characteristic curves are shown in Fig. 7a. In this circuit the detector tube is shown as a triode, and includes the grid leak resistor 20, and shunt condenser 20', in the low alternating potential side of the tuned input circuit. The resistor 21 is connected between the grid and plate of the tube 23, the cathode of which is grounded, and resistor 21 is connected in series with resistor 20. The resistor 21 and grounded condenser 21' comprise the radio and audio frequency pulsation suppressor network connected to the automatic volume control circuit.

Due to the direct connection of the plate of the shunt tube 23 to the negative end of resistor 20 in Fig. 7, an initial bias of −25 volts is obtained on the grid detector thus preventing high plate current. The plate shunt, which causes audio distortion, until the carrier peak voltage exceeds the delay bias 15', is removed as soon as the grid of the shunt tube becomes slightly negative. In the case under consideration if the grid of the shunt tube 23 is 3 volts negative, a plate voltage of approximately +30 volts is required to make the plate of the tube 23 draw current. As a 3 volt negative voltage on the grid of tube 23 is obtained with 33 carrier peak volts (see Fig. 7a), the modulation of the I. F. signal may be 100% without causing plate current in the shunt tube at any time, as the highest instantaneous positive plate voltage would then be −3+33=+30 volts.

In Fig. 7a is shown the various characteristics of the circuit of Fig. 7, and the curves are believed self-explanatory. In Fig. 7, by way of example, the resistor 20 may be given a value of 0.55 megohm; the resistor 21 may have a value of 0.91 megohm; the condenser 21' may have a value of 0.02 mfd.; the condenser 20' may have a value of 0.0001 mfd., and the battery 15' may place the cathode of the detector tube at a voltage of +30 volts above ground.

The arrangements in Figs. 4 and 7, besides securing delayed automatic volume control action, also prevent excessive plate current of the grid detector as the control grids cannot assume zero bias in the absence of signals. Thus, in this respect, these arrangements present different solutions of the problem solved in Fig. 2 by using the regulating grid. If a co-planar grid tube is used, as in Fig. 4, the plate choke in Fig. 7 becomes unnecessary. Of course, in Fig. 7, the primary or secondary circuits, or both, feeding the detector tube may be tuned.

It was previously pointed out that high plate supply voltages are required on a grid detector to prevent audio plate overload with 100% modulated signals, and still obtain sufficient output voltage at 20% modulated signals. It was shown, furthermore, that a normal co-planar grid tube with resistance coupling requires a 500 volt B-supply voltage to obtain approximately 52 volts audio output with a 20% modulated I. F. signal. As the automatic volume control characteristic of relatively good receiving sets is such as to allow a three to one increase of I. F. voltage from weak to strong signals, the above value of 53 volts is to be divided by three, giving only approximately 18 volts obtainable output for 20% modulation of a weak signal; that is, if 100% modulated strong signal should not overload the detector. In order to overcome this difficulty there is utilized the circuit arrangement shown in Fig. 8 wherein the second detector uses a co-planar grid tube with a regulation grid, as explained in connection with Fig. 2.

In this circuit there is utilized the regulating grid arrangement as shown in Fig. 2, and also the shunt diode for obtaining delayed automatic volume control as described in Fig. 4. The tube 30 has its co-planar signal grids connected to opposite sides of the tuned input circuit, the latter comprising the coil 31 and the tuning condenser 32. It will be understood that the network preceding coil 31 comprises the usual networks of a superheterodyne receiver. The cathode of tube 30 is connected to ground through a resistor R, and the latter may have a magnitude such that the cathode is substantially +30 volts above ground. The bleeder resistor $R_1$ is connected between the grounded side of resistor R and the positive terminal of the voltage supply source B.

The regulation grid 33 of tube 30 is connected to an intermediate point on bleeder resistor $R_1$ through a path which includes resistor $R_3$, lead 34, the conductive rod 35, the slidable contactor 36, conductive rod 37 and lead 38. The lead 38 is connected to a point on bleeder resistor $R_1$ such that this point is at +20 volts with respect to ground. The condenser 43 provides a low impedance path from this point to the cathode of tube 30.

The grid leak resistor 40, and shunt condenser 41 are connected between the midpoint of coil 31 and the cathode of tube 30, and resistor R is shunted by condenser 42. The diode 50 has its anode connected to the grid side of resistor 40 through resistor 51, the anode side of resistor 51 being grounded through condenser 52. Resistor 51 and condenser 52 comprise the radio and audio frequency pulsation suppressor filter network, and the automatic volume control connection to the controlled tubes of the receiver is made to the anode side of resistor 51. The conductive rod 37 includes a resistor element $R_2$, and one side of this resistor element is connected by means of lead 60 and condenser 61 to the grid side of grid leak resistor 40. The plate of tube 30 is connected to ground through a path which includes condenser 70 and resistor 71, while it is also connected to the B-supply source through the choke 72. Resistor $R_3$ provides, with the grid cathode capacity of tube 30, a filter section to prevent high frequency voltages on grid 33.

The audio network following the second detector tube 30 is shown as including, merely by way of illustration, an audio amplifier tube 80 of the pentode type. It is not necessary to explain in detail the energizing circuits of the pentode tube 80, since they are well known to those skilled in the art. It is sufficient to point out that the plate circuit thereof may be connected to additional amplifier stages, or to a reproducer.

The signal input grid of pentode output tube 80 is connected by lead 81 to the conductive rod 82, the contactor 83 being slidable along rod 82, and also being in sliding contact with resistor 71. The dotted line 84 connecting the contactors 83 and 36 is to be understood as designating a mechanical uni-control device for operating contactors 83 and 36 in unison, and it is to be clearly understood that it is not a conductive connection between the two contactors.

The action of the regulating grid 33 in maintaining a substantially fixed dynamic center, and the action of the shunt diode 50 for obtaining a delayed automatic volume control effect have been previously described. The regulating grid 33, in the circuit of Fig. 8, should be still negative at maximum I. F. signal on the co-planar grids of tube 30, instead of zero as assumed before, as it is used for audio amplification as well. The manual volume control device comprises the two contactors, or sliders, 83 and 36. At low and medium volume, the audio voltage on the co-planar grids of tube 30 alone controls the plate swing of the tube, and the slider on resistor 71 takes off more or less of the audio plate voltage for the power tube 80.

With low modulated signals the maximum voltage thus obtained is not sufficient with moderate plate supply voltages, and further movement of the volume control device causes the second slider to feed an increasing amount of audio voltage to the grid 33 which aids the co-planar grids to obtain a larger plate circuit output voltage. The audio voltage on resistor R2 is obtained from the grid leak resistor 40 through the coupling condenser 61. The plate supply voltage in the circuit of Fig. 8 may be reduced from 500 volts to less than 100 volts in accordance with the previous assumption in Fig. 1, provided that the co-planar grids do not swing the plate current to cut-off at the strongest 100% modulated signal input. This latter condition can be taken care of in the design of tube 30.

With strong modulation the sliders 83—36 are moved down, as the audio voltage developed on resistor 71 is ample enough to supply the audio grid swing for tube 80. If the resistor R2 was extended down to a low position of slider 36, the tube 30 would receive an additional audio control signal on grid 33. This might overload the plate characteristic of tube 30 as the audio signal produced by a strong modulation on the co-planar grids (audio developed on resistor 40) is about all that the tube 30 can handle. The audio signal on the co-planar grids cannot be controlled. Therefore, the resistor R2 should be connected in only after the slider 83 has reached the top of resistor 71. Voltage from resistor R2 is used only if the modulation of the signal is so weak that an additional gain in the detector tube due to audio signal on grid 33 is desirable.

In connection with Figs. 4, 7 and 8 it is pointed out that the delay bias circuit, aside from providing a bias for a grid detector in the absence of signals without placing any additional load on the detector tuned input circuit, is significant because of its independence of modulation percentage once the carrier voltage has increased beyond the delay battery voltage. Such is not the case in the known type of delayed diode circuit, as the delay voltage remains fixed in series with the diode load resistor. In the presently disclosed delay bias circuits, however, the delay voltage consists of a d. c. voltage developed due to the current through the shunting diode, which is permanently removed once the carrier voltage is of a magnitude such as to cause the shunt diode to open the circuit for direct currents. The filter section associated with the shunting diode assures the development solely of d. c. voltages at the shunt diode anode.

While I have indicated and described several systems for carrying my invention into effect, it will be apparent to one skilled in the art that my invention is by no means limited to the particular organizations shown and described, but that many modifications may be made without departing from the scope of my invention, as set forth in the appended claims.

What I claim is:

1. In a detector circuit of the type including a co-planar grid tube, a signal input circuit connected between the co-planar grids and the cathode and an output circuit connected between the anode of the tube and its cathode, a gain regulation electrode disposed in the electron stream, and between the co-planar grids and the cathode, said regulation electrode being connected to the cathode through a pair of opposed direct current voltage sources, one of the sources being dependent in magnitude on the space current flow of the tube and being sufficiently more positive in potential than the other source to cause the gain regulation electrode to automatically counteract large increase of the space current which is caused by a decrease in the effective negative direct current potentials of the co-planar grids of the detector tube, an audio amplifier following said detector tube, means for adjusting the transmission of detected signals between the detector output circuit and the input circuit of said audio amplifier, and additional means for impressing detected signals upon said regulation grid.

2. In a detector circuit of the type including a co-planar grid tube, a signal input circuit connected between the co-planar grids and the cathode, and an output circuit connected between the anode of the tube and its cathode, a gain regulation electrode disposed in the electron stream, and between the co-planar grids and the cathode, said regulation electrode being connected to the cathode through a pair of opposed direct current voltage sources, one of the sources being dependent in magnitude on the space current flow of the tube and being sufficiently more positive in potential than the other source to cause the gain regulation electrode to automatically counteract large increase of the space current which is caused by a decrease in the effective negative direct current potentials of the co-planar grids of the detector tube, and means for impressing the audio component of detected signal energy upon said regulation grid.

3. In a detector circuit of the type including a co-planar grid tube, a signal input circuit connected between the co-planar grids and the cathode, and an output circuit connected between the anode of the tube and its cathode, a gain regulation electrode disposed in the electron stream, and between the co-planar grids and the cathode, said regulation electrode being connected to the cathode through a pair of opposed direct current voltage sources, one of the sources being dependent in magnitude on the space current flow of the tube and being sufficiently more positive in potential than the other source to cause the gain regulation electrode to automatically counteract large increase of the space current which is caused by a decrease in the effective negative direct current potentials of the co-planar grids of the detector tube, and a diode having its anode connected to said co-planar grids and its cathode connected to the detector cathode, said one source being an impedance in the detector cathode circuit for developing a voltage normally maintaining the diode anode positive with respect to its cathode.

4. In a radio receiver of the type including an intermediate frequency amplifier, a detector network and an audio frequency amplifier, said detector network including a tube of the co-planar grid type, a gain regulation grid disposed between the co-planar grids and the cathode of the detector tube, an impedance in the space current path of the detector tube, a source of fixed direct current voltage connected between the low potential side of said impedance and the anode circuit of said detector tube, a direct current connection between the regulation grid and a point on said direct current voltage source whose potential is less positive than the potential across the said impedance to an extent such that the effective bias on the gain regulation grid is negative in the absence of received signals, an adjustable transmission audio line connected between the anode circuit of the detector tube and the input electrodes of said audio amplifier, a path of low impedance to the audio component of detected signals connected between the input grid circuit of the detector tube and said gain regulation grid connection, a diode having its anode connected to the said co-planar grids and its cathode connected to the said low potential side of the impedance in the detector tube cathode circuit, and an automatic gain control connection between said intermediate frequency amplifier and the anode circuit of said diode.

5. In combination with a source of signal waves, a tube having at least a cathode and a plate, a pair of co-planar grids in the electron stream to the plate, a signal input circuit connected between the cathode and grids and including a resistive impedance in the grid current path between the grids and cathode whereby the grids are negatively biased when signals are received, an output circuit connected between the plate and cathode, a resistor in the space current path of the tube developing a direct current voltage varying in magnitude with said bias, an electrode disposed in the electron stream to said plate, a direct current voltage source of fixed value connecting said last electrode to a point on the resistor such that the electrode is negatively biased due to the polarity opposition of the fixed source and said variable voltage, a diode having its anode connected to a second point of said resistor through said impedance, said second point being positive with respect to a third point on the resistor to which the diode cathode is connected, and an automatic gain control connection to the grid side of said resistive impedance.

6. In combination with a source of waves, a rectifier tube comprising a cathode and at least one cold electrode, a wave input circuit connected between the cathode and cold electrode, a resistor in the electron current path between the cathode and cold electrode for developing a uni-directional potential from waves impressed on said input circuit, said potential being variable in magnitude with the wave amplitude, a source of direct current voltage maintaining said cathode and cold electrode at a positive potential with respect to a fixed potential point, a diode having its anode connected to a positive potential point on said second source through said resistor, the diode cathode being connected to said fixed point, said uni-directional potential rendering the diode non-conductive for waves above a predetermined amplitude, the anode side of said resistor being connected to the said cold electrode, and the potential between said positive point and the fixed point being in polarity opposition to said variable potential and exceeding the latter in value for waves less than said predetermined amplitude whereby for the latter the diode is conductive and develops a voltage across the resistor acting to negatively bias the cold electrode of said rectifier.

7. In combination with a source of waves, a rectifier tube comprising a cathode and at least one cold electrode, a wave input circuit connected between the cathode and cold electrode, a resistor in the electron current path between the cathode and cold electrode for developing a uni-directional potential variable in magnitude with the wave amplitude, a source of direct current voltage maintaining said cathode and cold electrode at a positive potential with respect to a fixed potential point, a diode having its anode connected to a positive potential point on said second source through said resistor, the diode cathode being connected to said fixed point, the anode side of said resistor being connected to the said cold electrode, and the potential between said positive point and the fixed point being in polarity opposition to said variable potential and exceeding the latter in value for waves less than a predetermined amplitude whereby for the latter the diode is conductive and develops a voltage across the resistor acting to negatively bias the cold electrode of said rectifier, a wave transmission tube preceding the rectifier, and an automatic gain control connection for said transmission tube connected to a point on said resistor which assumes a negative potential with respect to said fixed potential point when waves above said amplitude are rectified.

8. In combination with a source of waves, a rectifier tube comprising a cathode and at least one cold electrode, a wave input circuit connected between the cathode and cold electrode, a resistor in the electron current path between the cathode and cold electrode for developing a uni-directional potential variable in magnitude with the wave amplitude, a source of direct current voltage maintaining said cathode and cold electrode at a positive potential with respect to a fixed potential point, a diode having its anode connected to a positive potential point on said second source through said resistor, the diode cathode being connected to said fixed point, said uni-directional potential rendering the diode non-conductive for waves above a predetermined amplitude, the anode side of said resistor being connected to the said cold electrode, and the potential between said positive point and the fixed point being in polarity opposition to said variable potential and exceeding the latter in value for waves less than a predetermined amplitude whereby for the latter the diode is conductive and develops a voltage across the resistor acting to negatively bias the cold electrode of said rectifier, a plate electrode in said rectifier tube, said direct current voltage source comprising an impedance in the space current circuit between said plate and rectifier tube cathode which develops a direct current voltage dependent in magnitude on the bias of the rectifier tube cold electrode.

9. In combination with a wave amplifier of a radio receiver, a rectifier tube including at least a cathode and cold electrode, a path between the cathode and electrode which includes a wave input circuit and a resistor in series whereby there is developed across the resistor a direct current voltage which varies with wave amplitude, means for coupling the amplifier output and said input circuit, an automatic gain control connection between the amplifier and a point on said resistor which assumes a negative potential with respect to the rectifier cathode when waves above a desired amplitude are received, means for delaying the action of said gain control, said means comprising a direct current voltage source establishing said rectifier electrodes at a positive potential with respect to ground, a diode having its anode connected to a point on the last source which is positive with respect to ground, said last connection including said resistor, said diode cathode being connected to ground, and the potential between ground and said point on the direct current voltage source being in polarity opposition to said variable voltage and exceeding the latter for waves of less than a desired amplitude.

OTTO H. SCHADE.